United States Patent
Ishii

(10) Patent No.: US 9,674,387 B2
(45) Date of Patent: Jun. 6, 2017

(54) IMAGE FORMING DEVICE, IMAGE FORMING METHOD AND IMAGE FORMING SYSTEM ENABLING A PLURALITY OF IMAGE ANALYSIS PROCESSES TO BE PERFORMED

(71) Applicant: KONICA MINOLTA, INC., Chiyoda-ku, Tokyo (JP)

(72) Inventor: Hiroshi Ishii, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/642,384

(22) Filed: Mar. 9, 2015

(65) Prior Publication Data
US 2015/0264195 A1   Sep. 17, 2015

(30) Foreign Application Priority Data

Mar. 11, 2014   (JP) ................................ 2014-047981

(51) Int. Cl.
*G06K 15/00*   (2006.01)
*H04N 1/00*   (2006.01)

(52) U.S. Cl.
CPC ............................... *H04N 1/00931* (2013.01)

(58) Field of Classification Search
CPC combination set(s) only.
See application file for complete search history.

(56) References Cited

U.S. PATENT DOCUMENTS

| 7,486,414 B2* | 2/2009 | Arai | G03G 15/5062 |
| | | | 358/1.9 |
| 2007/0091390 A1* | 4/2007 | Kimura | G03G 15/50 |
| | | | 358/500 |
| 2012/0105881 A1* | 5/2012 | Fukaya | H04N 1/00031 |
| | | | 358/1.9 |

FOREIGN PATENT DOCUMENTS

| JP | 2005161650 A | 6/2005 |
| JP | 2010154359 A | 7/2010 |
| JP | 2010262220 A | 11/2010 |
| JP | 2012003335 A | 1/2012 |

OTHER PUBLICATIONS

Japanese Office Action (and English translation thereof) dated Mar. 30, 2016, issued in counterpart Japanese Application No. 2014-047981.

* cited by examiner

*Primary Examiner* — Henok A Shiferaw
(74) *Attorney, Agent, or Firm* — Holtz, Holtz & Volek PC

(57) ABSTRACT

An image forming device includes an image forming section, a sheet discharging section that discharges a sheet formed an image to outside of the device, a conveying path that conveys a sheet, a reading section that reads the image formed on the sheet on the conveying path leading from the image forming section to the sheet discharging section and outputs image data, and a control section that controls formation of the image to sequentially form images on sheets at a predetermined cycle, and the control section receives the image data, can execute a plurality of types of image analysis processes on the image data and can select and execute one or more types of image analysis processes which can be executed among the plurality of types of image analysis processes for a predetermined number of the sheets.

23 Claims, 11 Drawing Sheets

IMAGE FORMING DEVICE, IMAGE FORMING METHOD AND IMAGE FORMING SYSTEM ENABLING A PLURALITY OF IMAGE ANALYSIS PROCESSES TO BE PERFORMED

CROSS-REFERENCE TO RELATED APPLICATIONS

The present application claims priority under 35 U.S.C. §119 to Japanese Patent Application No. 2014-047981, filed Mar. 11, 2014. The contents of this application are incorporated herein by reference in their entirety.

BACKGROUND OF THE INVENTION

Field of the Invention

The present invention relates to an image forming device which can sequentially form images on sheets at a predetermined cycle, and an image forming method and an image forming system.

Description of the Related Art

In an image forming device such as a copier, a printer and a multifunction printer and an image forming system, printing is performed by forming a toner image on a photoreceptor provided at an image forming section based on image data obtained by, for example, being read from a document reading device, transferring the toner image to a sheet fed from a paper feed tray and fixing the toner image. Further, the sheet on which an image has been formed on the front side is conveyed by being reversed at a reverse conveying section if desired, and returned to a sheet conveying section, and thereby an image can be formed and fixed on the back side.

Because a sheet on which an image is formed but not fixed is conveyed to a fixer which makes a sheet pass through a fixing roller, a pressure belt, or the like, and fixes a toner image on the sheet by heating, pressure, or the like, there is a case where a fixing member such as the fixing roller and the pressing belt may be contaminated by a toner over time, or a toner may adhere to the fixing member by sheet jam. When a sheet is newly made to pass through such a fixer, the sheet is contaminated by the toner of the fixing member adhering to the sheet.

Further, there is a case where a position where an image is formed is displaced in both side printing or where image density may change over time. Such contamination, displacement and change in the image density become a defect of the image depending on the level and degrade printing quality. It is therefore necessary to visually check the output.

Further, there is a case where when operating time is accumulated, image adjustment is not favorably performed, which degrades image quality such as color stability.

However, when a large number of pages are printed or a large number of copies are made, if the printed results are tried to be visually checked, a huge amount of man-hours and cost is required, and, further, accuracy varies. Therefore, there is a proposed device which detects whether or not there is a defect in image data after the image data is transferred to a sheet. For example, Japanese Patent Laid-Open No. 2005-161650 proposes an image forming device which forms a pattern for color calibration on a sheet, visualizing the pattern to detect a characteristic amount and performing a color calibration process based on the detected characteristic amount.

However, in the proposed technique which is used in an adjustment mode, correction is not performed in real time during image formation, and only one process is performed. If a plurality of processes are tried to be performed in real time, for example, between sheets of image formation, it is difficult to select a process that can be executed, and a user cannot easily perform setting.

The present invention has been made in view of the above-described circumstances, and at least one object of the present invention is to provide an image forming device which enables a plurality of image analysis processes to be performed in real time, and an image forming method and an image forming system.

SUMMARY OF THE INVENTION

To achieve at least one object of the present invention, an image forming device of one aspect of the present invention includes an image forming section that forms an image on a sheet, a sheet discharging section that discharges a sheet on which an image has been formed to outside of the device, a conveying path that conveys a sheet, a reading section that reads the image formed on the sheet on the conveying path leading from the image forming section to the sheet discharging section and outputs image data, and a control section that controls formation of the image to sequentially form images on sheets at a predetermined cycle, and the control section receives the image data and can execute a plurality of types of image analysis processes on the image data, and selects and executes one or more types of image analysis processes which can be executed among the plurality of types of image analysis processes for a predetermined number of the sheets.

In the image forming device according to the above-mentioned aspect, it is preferable that the control section sets the same or different number for the predetermined number of sheets for each type of an image analysis process.

In the image forming device according to the above-mentioned aspect, it is preferable that when the control section selects the image analysis processes for each of the predetermined number of the sheets, the control section selects the image analysis processes so that process time for the image analysis processes does not exceed a transferring start time point at which image data of sheets of the next page and thereafter is started to be output from the reading section and transferred.

In the image forming device according to the above-mentioned aspect, it is preferable that the image forming device further comprises a storage section that temporarily stores the image data read at the reading section and transferred to the control section,
wherein the control section can perform the image analysis processes in parallel with transferring of the image data from the reading section to the storage section, and
the control section selects the image analysis processes according to transfer time for transferring the image data from the storage section to the control section and time required for the image analysis processes.

In the image forming device according to the above-mentioned aspect, it is preferable that when the control section selects the image analysis processes for each of the predetermined number of the sheets, the control section selects the image analysis processes so that process time for the image analysis processes does not exceed a time point at which image data read at the reading section for a sheet after the predetermined number of sheets is started to be transferred from the storage section to the control section.

In the image forming device according to the above-mentioned aspect, it is preferable that when the control section selects the image analysis processes, the control section determines process time used for judgment based on a data amount required for each image analysis process and/or operation accuracy of each image analysis process.

In the image forming device according to the above-mentioned aspect, it is preferable that the control section determines the data amount from an area of an image region to be processed and/or resolution of an image to be read.

In the image forming device according to the above-mentioned aspect, it is preferable that the image forming device further comprises an operating section that receives an operation from a user and selects the image analysis processes.

In the image forming device according to the above-mentioned aspect, it is preferable that the control section presents executable processes as options to the user and selects a process designated by the user through the operating section.

In the image forming device according to the above-mentioned aspect, it is preferable that when the user designates a desired image analysis process, the control section executes selection of the image analysis process and further presents other image analysis processes as options to the user over again.

In the image forming device according to the above-mentioned aspect, it is preferable that when the process time exceeds a limit time according to the selected image analysis processes, the control section performs adjustment so that the process time becomes within the limit time by changing the number of image analysis processes to be executed.

In the image forming device according to the above-mentioned aspect, it is preferable that when the process time exceeds a limit time according to the selected image analysis processes, the control section performs adjustment so that the process time becomes within the limit time by reducing process time for one or more image analysis processes.

In the image forming device according to the above-mentioned aspect, it is preferable that the control section reduces the process time by changing content of the image analysis processes.

In the image forming device according to the above-mentioned aspect, it is preferable that the control section sequentially performs the plurality of image analysis processes, and selects executable processes for each of a predetermined number of sheets based on accumulation of process time of the plurality of image analysis processes.

In the image forming device according to the above-mentioned aspect, it is preferable that the control section performs the plurality of image analysis processes in parallel, and selects executable processes for each of a predetermined number of sheets based on process time of the parallel processes.

In the image forming device according to the above-mentioned aspect, it is preferable that the control section preferentially selects image analysis processes having higher priority in order of priority determined in advance.

To achieve at least one object of the present invention, an image forming method for an image forming device or an image forming system, the method comprising:

a step of performing control to sequentially form images on sheets at a predetermined cycle;

a step of performing control to read an image formed on a sheet and output image data; and a step of performing control to receive the image data, enabling a plurality of types of image analysis processes to be executed on the image data, and selecting and executing one or more types of image analysis processes which can be executed among the plurality of types of image analysis processes for a predetermined number of the sheets.

In the image forming method according to the above-mentioned aspect, it is preferable that the same or different number is set for the predetermined number of the sheets for each of the types of the image analysis processes.

In the image forming method according to the above-mentioned aspect, it is preferable that when the image analysis processes are selected for each of the predetermined number of the sheets, the image analysis processes are selected so that process time for the image analysis processes does not exceed a starting time point at which image data of a sheet of the next page and thereafter is started to be output from a reading section.

In the image forming method according to the above-mentioned aspect, it is preferable that the image forming method further comprises a step of reading an image formed on a sheet, temporarily storing the image data and transferring the image data to the image analysis processes, wherein the image analysis processes can be executed in parallel to temporal storage of the image data, and the image analysis processes are selected according to transfer time for transferring the temporarily stored image data and time required for the image analysis processes.

In the image forming method according to the above-mentioned aspect, it is preferable that image analysis processes having higher priority are preferentially selected in order of priority determined in advance.

To achieve at least one object of the present invention, an image forming method of one aspect of the present invention comprises a step of performing control to sequentially form images on sheets at a predetermined cycle; a step of performing control to read an image formed on a sheet and output image data; and a step of performing control to receive the image data, enabling a plurality of types of image analysis processes to be executed on the image data, and selecting and executing one or more types of image analysis processes which can be executed among the plurality of types of image analysis processes for a predetermined number of the sheets.

To achieve at least one object of the present invention, an image forming system of one aspect of the present invention includes an image forming section that forms an image on a sheet, a conveying path that conveys a sheet, a reading section that reads the image formed on the sheet on the conveying path and outputs image data, and a control section that controls formation of the image to sequentially form images on sheets at a predetermined cycle, and the control section receives the image data and can execute a plurality of types of image analysis processes on the image data, and selects and executes one or more types of image analysis processes which can be executed among the plurality of types of image analysis processes for a predetermined number of the sheets.

DETAILED DESCRIPTION OF THE PREFERRED EMBODIMENTS

One embodiment of the present invention will be described below based on the accompanying drawings.

Figure 1:
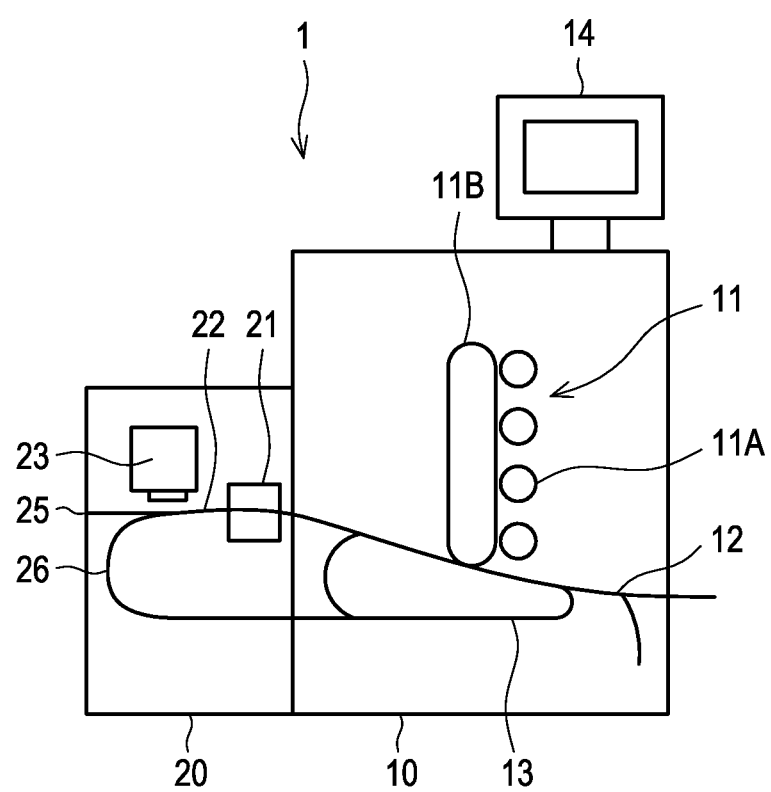
FIG. 1 is a schematic diagram illustrating an image forming device of one embodiment of the present invention.

In an image forming device 1, as illustrated in FIG. 1, an image forming device body 10 which forms an image and a reading and transferring unit 20 are mechanically and electrically connected.

It should be noted that a connection configuration of the image forming device of the present invention is not limited to this. Further, other devices may be disposed between the image forming device body 10 and the reading and transferring unit 20.

Further, while, in this embodiment, the image forming device of the present invention is configured with the image forming device body and the reading and transferring unit, it is also possible to configure the whole image forming device of the present invention by providing a configuration corresponding to the reading and transferring unit within the image forming device body.

Further, the image forming system may be configured by connecting such as an image forming device and a reading and transferring device which are provided as separate devices, or by providing a configuration corresponding to the reading and transferring unit at a post-processing device, or the like, and connecting the post-processing device to the image forming device.

At an upper side of the image forming device body 10, an operation display section 14 is provided. The operation display section 14 which is configured with an LCD of a touch panel, or the like, can receive operation from an operator and display information. The operation display section 14 is used as both an operating section and a display section. It should be noted that the operating section can be configured separately from the display section using a mouse, a tablet, or the like. Further, the operation display section 14 may be provided on other devices, or may be configured to be able to move. Through the operation display section 14, selection of an image analysis process which is to be performed based on image data, setting of priority and setting of a predetermined number of sheets for which each image analysis process is to be performed can be performed.

At a lower side of the image forming device body 10 or at an upstream side of the image forming device body 10, paper feed trays which are not illustrated and which can feed sheets are disposed.

Within the image forming device body 10, a conveying path 12 which conveys a sheet fed from any of the paper feed trays is provided, and an image forming section 11 is provided in the course of the conveying path within the image forming device body 10. The image forming section 11 has an intermediate transferring belt 11B, and a charger, an LD, a developer and a secondary transferring section which are disposed around a photoreceptor 11A for each color and which are not illustrated, and a fixer which is provided at a further downstream side in the conveying path 12 and which are not illustrated.

A reverse conveying path 13 diverges from the conveying path 13 at an upstream side of the position where the reading and transferring unit 20 and the conveying path 12 converge and at a downstream side of the fixer. The reverse conveying path 13 and the conveying path 12 converge at an upstream side of the image forming section 11.

The conveying path 12 extends toward the sheet conveying direction downstream side and connects to a conveying path 22 of the reading and transferring unit 20.

It should be noted that in the image forming section 11, a surface of the photoreceptor 11A is uniformly charged by the charger before an image is written, and an electrostatic latent image is formed on the photoreceptor 11A by the photoreceptor 11A whose surface has been uniformly charged being irradiated with a semiconductor laser by an LD. The developer develops the electrostatic latent image formed on the photoreceptor 11A by the LD using a toner member. Through this developing process, a toner image is formed on the photoreceptor 11A. The transferring section transfers the toner image of the photoreceptor 11A on a sheet conveyed from a paper feed tray. The sheet on which the toner image has been transferred is separated from the photoreceptor 11A and conveyed to the fixer. The toner member left at the photoreceptor 11A is removed by a cleaning section which is not illustrated. The fixer fixes the toner image transferred at a front side of the sheet as an output image by heating the conveyed sheet.

As described above, the reading and transferring unit 20 has the conveying path 22 connected to the conveying path 13. At the conveying path 22, a cooling section 21 for cooling a sheet conveyed through the conveying path 22 is provided, and a scanner 23 which detects an output image on a surface of a sheet conveyed through the conveying path 22 is disposed on the conveying path 22 at the downstream side of the cooling section 21. The scanner 23 may be one which reads an image of the whole sheet or one which reads part of an image on a sheet.

The scanner 23 configures part of a reading section of the present invention. It should be noted that scanners may be disposed at both above and below the sheet to simultaneously or selectively detect images on the front and back side of the sheet.

The conveying path 22 which extends toward the downstream side, discharges a sheet from the sheet discharging section 25 to outside of the device. It should be noted that the conveying path may be one which connects the post-processing device, or the like, at the downstream side of the reading and transferring unit 20. In this case, the sheet discharging section is provided at the post-processing device at the last stage. Further, a reverse conveying path 26 diverges from the conveying path 22 between a position where the scanner 23 is provided and a position of the sheet discharging section 25, and the reverse conveying path 26 and the reverse conveying path 13 of the image forming device body 10 converge. After the scanner 23 reads an image, it is possible to return the sheet to the image forming device body 10 and form an image on the back side of the sheet. It is possible to convey the sheet on which the image has been formed on the back side to the reading and transferring unit 20 and read the image on the back side of the sheet.

Figure 2:
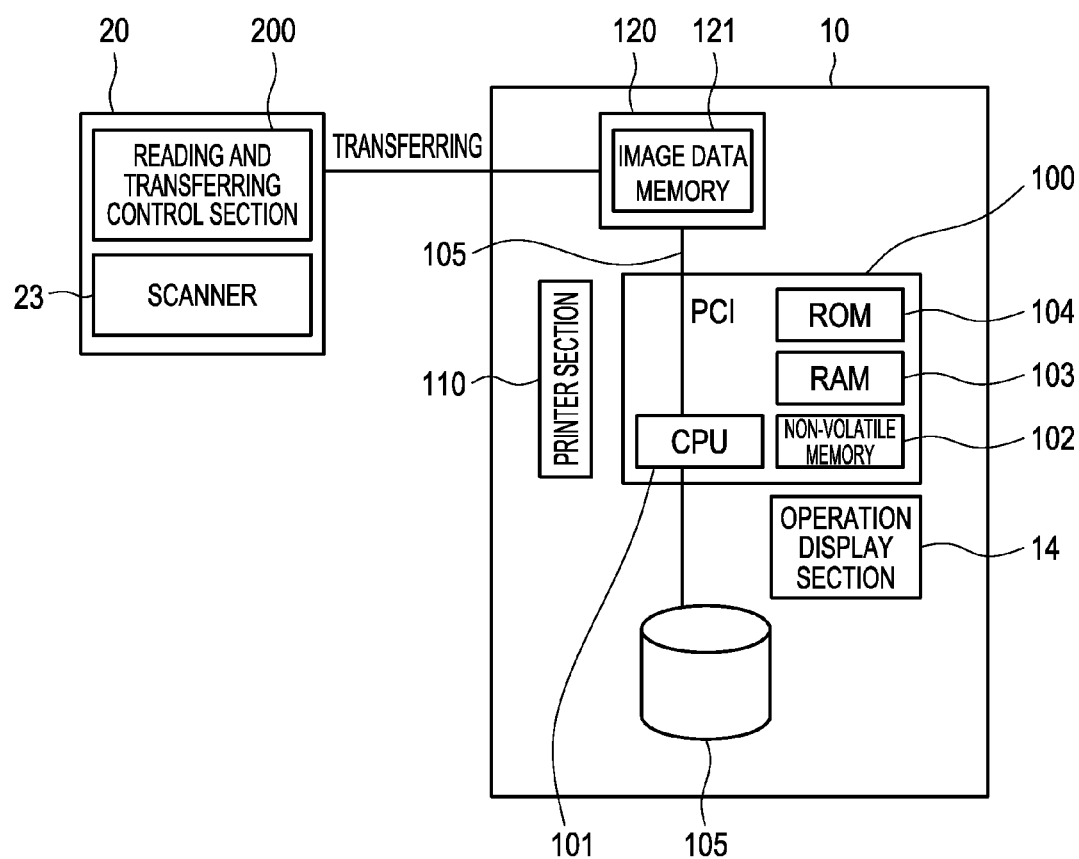
FIG. 2 is a block diagram illustrating functional blocks of the main part of the embodiment of the present invention.

Control blocks of the image forming device will be described next based on FIG. 2.

The image forming device body 10 has a whole control block 100, which has a CPU 101, a non-volatile memory 102, a RAM 103 and a ROM 104 as main components.

The non-volatile memory 102 is configured with a flash memory, or the like. In the non-volatile memory 102, initial printing setting information of the image forming device body 10, machine setting information such as a process control parameter, initial data of output setting, designation for reading of an output image at the reading section, content of the image analysis process, a segment of factors when the read image is judged as a defect, a criterion of each factor when the read image is judged as a defect, setting for each of a predetermined number of sheets in each image analysis process, a parameter for calculating process time, setting of priority of each image analysis process, and the like, are stored.

The RAM 103 is used as a work area or utilized for temporarily storing data while the CPU 101 operates.

In the ROM 104, a program for operating the CPU 101, and the like, is stored.

Further, the CPU 101 may be configured to be connected to an HDD 105 (Hard Disk Drive) so as to be able to control the HDD 105 to store image data for forming an image, image data read at the reading section, a result of the image analysis process, and the like.

The CPU 101 can read non-volatile data of the non-volatile memory 102 and write desired data in the non-volatile memory 102.

The CPU 101 can control operation of each section of the image forming device body 10 and the reading and transferring unit 20 according to the above-described machine setting information, printing setting information and output setting, and the like, and can control reading of an image at the reading section and execute various types of image analysis processes in real time during the image analysis processes in response to the image data transmitted from the reading section.

The CPU 101, the non-volatile memory 102, the RAM 103 and the ROM 104 serve as a control section of the present invention and control the whole image forming device 1. It should be noted that the control section may be one located outside of the image forming device body or one which is connected to the image forming device or the image forming system via a network.

The CPU 101 can perform various types of setting and operation instructions through the operation display section 14.

The operation display section 14 is connected to the CPU 101 so as to be able to control the operation display section 14. The operation display section 14 which is used as both a display section and an operating section, includes an LCD configured with a touch panel.

The operation display section 14 allows input of machine setting such as output condition setting and operation control conditions in the image forming device body 10 and input of setting of sheet information (size, type of a sheet) of each paper feed tray, display of the setting content, display of desired information such as a message, selection of image analysis processes to be performed on the image data read at the scanner 23, detailed setting of each image analysis process, setting of priority among the image analysis processes, and the like, through a touch panel type LCD under control of the CPU 101.

Further, a printer section 110 is connected to the CPU 101 so as to be able to control the printer section 110. The printer section 110 is configured with an image forming section 11, paper feed trays, conveying paths 12, 22, reverse conveying paths 13, 26, and the like.

Further, the CPU 101 has a PCI bus 105, to which an image data buffer unit 120 which is an optional unit, is connected.

The image data buffer unit 120 has an image data memory 121, in which image data transferred from the reading and transferring unit 20 is temporarily stored so as to be able to read the image data from the CPU 101. The image data memory 121 corresponds to a storage section of the present invention, which stores image data. It should be noted that it is also possible to use the above-described HDD 105 as the storage section which stores the image data. The image data memory 121 and the HDD 105 can serve as a reception buffer, and may be configured to be able to store image data corresponding to two or more faces of sheets. The reception buffer enables a process of transferring image data from the reading and transferring unit 20 to the reception buffer and storing the image data and a process of performing an image analysis process to be executed in parallel.

Further, the reading and transferring unit 20 has a scanner 23 as the main structure, which reads an image on a sheet conveyed through the conveying path 22. Further, a reading and transferring control section 200 is connected to the scanner 23 so that the reading and transferring control section 200 can be controlled, and the reading and transferring control section 200 operates according to instructions from the CPU 101. The reading and transferring control section 200 controls the scanner 23 and reads an image on a sheet at a predetermined timing, and after reading is completed, immediately transfers image data to the image data memory 121 of the image data buffer unit 120.

Basic operation of the above-described image forming device body 10 and the reading and transferring unit 20 will be described next.

In the image forming device body 10, image data is read from a document by the operation of the CPU 101, and image data transmitted from outside is acquired and accumulated.

When the image data is accumulated, output setting is performed before or after accumulation of the image data. The output setting can be set by an operation and input of an operator on a setting screen which allows operation and input at the operation display section 14. Further, output setting items are selected in the initial setting, and, even if setting is not input by the operator, output setting is performed through the initial setting.

When an image is output at the image forming device body 10, the CPU 101 performs a writing process, and the image forming section 11 performs writing on the photoreceptor 11A charged by the charging section by an LD, or the like. The printer section 110 controls each section in response to instructions from the CPU 101. In the image forming section 11, a latent image written on the photoreceptor 11A is developed at the developing section which is not illustrated as a toner image, and the toner image is transferred to a sheet conveyed through the conveying path 12 by an intermediate transferring belt and a secondary transferring section, and fixed at the fixer. At the photoreceptor 11A, after the toner image is transferred to the sheet, a residual toner is removed by the cleaning section which is not illustrated.

It should be noted that while description is provided assuming a color image forming device in this embodiment, this embodiment can be applied to a black-and-white image forming device.

The sheet on which an image has been formed is conveyed to the reading and transferring unit 20 through the conveying path 12. Further, the sheet on which an image has been formed may be reversed and conveyed by the reverse conveying path 13 and may return to an upstream side of the image forming section 11 before the sheet is conveyed to the reading and transferring unit 20, and an image may be further formed on the back side of the sheet.

At the reading and transferring unit 20, all or part of the output image on the sheet conveyed through the conveying path 22 is read at the scanner 23, and the read image data is transmitted to the image data memory 121. It should be noted that the reading and transferring control section 200 may perform control so that image data of sheets not corresponding to "each of a predetermined number of sheets" is not read or is discarded without the read image data being transferred to the image data memory 121.

At CPU 101, the image data which is transferred to the image data memory 121 and for which output is completed is transferred to the HDD 105 once, and read from the HDD 105 and a necessary image analysis process is executed. In the image analysis process, a type of an image analysis process determined at the CPU 101 or an image analysis process set by the operator through the operation display section 14 is executed. In the present invention, the content of the image analysis process is not limited to a specific process, and the number of image analysis processes is not limited.

The result of the image analysis process can be used to apply feedback control to an output of subsequent printing or to perform treatment for immediately stopping operation of machine when a defect is detected. It should be noted that, in the present invention, content of the process performed based on the result of the image analysis process is not limited, and it is also possible to employ a configuration where no particular process is performed and data of the process result is only stored and displayed.

Content of a typical image analysis process will be described below as an example.

For example, it is possible to perform waste sheet detection using a full image, perform variable confirmation, confirm sheet displacement, and the like. One of these may be set as default. It is also possible to allow selection of other detecting methods.

<Detection of Waste Sheet Using Full Image>

To detect a waste sheet using a full image, for example, a full image is read and characteristic points are extracted from the full image to compare the image with original document data. There are various methods for extracting characteristic points.

Because SIFT is a method which requires time to extract characteristic points and which is a method in which local patterns of the image are indexed using high-dimensional characteristic amount, performance degrades for a repetitive pattern of texture and a document. In GH (Geometric Hashing), operation time varies according to detection accuracy. Further, there may be a simple method which does not use characteristic points but uses histogram.

Further, it is possible to change detection accuracy during a process. Process time becomes variable according to this "detection accuracy".

<Variable Confirmation>

In variable confirmation, a variable portion upon variable printing is read in collaboration with a controller to detect a waste sheet. A region read at this time is not necessarily a full image. By limiting the read region to part, process time and transferring time become short.

Further, if the read data is stored in the HDD using an OCR (optical character recognition), an output can be confirmed later. In this case, process time can be made shorter.

<Detection of Sheet Displacement>

In detection of sheet displacement, an edge of a transfer sheet is detected to detect an extremely displaced transfer sheet. Process time varies according to accuracy for detecting an angle.

<Color Stability>

Color stability is realized by reading an image and observing change of color.

Detection accuracy is adjusted by adjusting the number of sheets for which judgment is to be performed (for each page/for each sheet/for each job, or the like) or simplifying an operation process, or the like.

A control strip can be selected when there is a margin for cutting.

In region designation, a rectangular region of a read image is designated, resolution is designated, attribute of a read pixel is designated, or the like. In the case of attribute designation, for example, if a text region is designated, only text pixels become a target of comparison. For example, operation is performed by comparing only part where a continuous area of the text pixels of document data is equal to or larger than a fixed value. It becomes possible to adjust process time according to an area/resolution of an image to be processed.

<Front and Back Side Position>

Front and back side position can be calculated by detecting a register mark printed on the image. It is possible to adjust detection time and accuracy according to the number of register marks.

<Barcoding>

In barcoding, a barcode is read. The read barcode is stored in the HDD and confirmed later, or information is output therefrom, or application is activated.

A summary in the above-described image analysis processes is indicated in Table 1.

In each image analysis process which includes a large category, a middle category and a small category, processes indicated in the summary can be performed. It is possible to adjust process content according to an adjustment parameter. Feedback destinations include a SC (serviceman call), an alarm, storage of a record, image adjustment such as magnification and position control, process control, and the like.

TABLE 1

| Large Category | Middle Category | Small Category | Summary | Adjustment parameter | FB |
|---|---|---|---|---|---|
| Waste sheet detection | Comparing full image Designate a part such as front or end edge | Comparing summary data Sheet displacement | Compare full image Detect an angle of horizontal/vertical line Read OCR | Detection accuracy | SC or alarm SC or alarm SC or alarm |

TABLE 1-continued

| Large Category | Middle Category | Small Category | Summary | Adjustment parameter | FB |
|---|---|---|---|---|---|
| | | Variable part | Compare full image in designated part | | |
| Barcode | | | Process barcode information (application) or record information | Data storage Selecting application | SC or alarm or storage of a record |
| Front and back side position | | | Read a register mark on the front and back side of full page | Detection accuracy | Magnification, Position control etc |
| Color stability | Control strip | Full region | Reading images | Detection accuracy | γ process |
| | Output image | Designated region | Compare between copies Each of object | Region | |

Next, an operation screen through which an image analysis process is set will be described based on FIG. 3 and FIG. 4.

A screen process operation screen 1400 can be read out from a machine setting screen, or the like, of the image forming device and can be displayed at the operation display section 14.

The screen process operation screen 1400 includes a job display part 1401 for displaying job content. In this drawing, job is not defined.

Further, the screen process operation screen 1400 includes a real time ON/OFF button 1402 which allows setting as to whether or not to perform a screen process in real time, and allows switching between a state where the screen process is performed in real time and a state where the screen process is not performed in real time by depressing the real time ON/OFF button 1402. Switching of ON/OFF is indicated by changing display color. In this drawing, when the button is colored, it indicates that the real time ON/OFF button is put into an ON state.

Further, for each image analysis process, a function selection/priority button is provided, and in the drawing, a waste sheet detection button 1410, a color stability button 1411, a front and back side position button 1412 and a barcode button 1413 are disposed so as to be able to be depressed. By depression of any of these buttons, the designated button is set. At this time, it is possible to set priority of the image analysis processes.

In the drawing, waste sheet detection and front and back side position are selected, and the first priority is given to the waste sheet detection, and the second priority is given to the front and back side position.

In a preset field 1420, current setting content before setting is displayed. Current setting content is reflected on the preset field 1420 by updating the display.

A detailed setting button 1430 is a button for setting detailed content of each image analysis process, and, when the detailed setting button 1430 is depressed, the following image analysis process detailed setting screen 1500 is displayed.

At the image process detailed setting screen 1500, it is possible to perform detailed setting for each image analysis process (waste sheet judgment, color stability, front and back side position and barcode).

At an item of waste sheet judgment, it is possible to set a level of detection accuracy by moving a bar of a slide bar 1510 to an arbitrary position within a range. Further, as optional setting, it is possible to set variable confirmation, sheet displacement confirmation, by depression of a variable confirmation button 1511 and a sheet displacement confirmation button 1512, it is possible to set whether or not variable confirmation is performed, and whether or not sheet displacement confirmation is performed. By depression of the buttons, whether or not each confirmation is performed is alternately switched. A judgment sheet number field 1513 is an item for setting for each of how many sheets the image analysis process is performed, and the number of sheets can be set through a numeric keypad or the like which is not illustrated.

At an item of color stability, it is possible to set a level of detection accuracy by moving a slide bar 1520 to an arbitrary position within a range. Further, as optional setting, it is possible to set the control strip and region designation, and by depression of a control strip button 1521 and a region designation button 1522, it is possible to set whether or not the control strip (confirmation of color management disposed outside a region of a finish) is provided, and whether or not region designation is provided. By depression of the respective buttons, whether or not the control strip is provided and the region designation is provided are alternately switched. A judgment sheet number field 1523 is an item for setting for each of how many sheets, the image analysis process is performed, and the number of sheets can be set through a numeric keypad or the like which is not illustrated.

At an item of front and back side position, it is possible to set a level of detection accuracy by moving a bar of a slide bar 1530 to an arbitrary position within a range. A judgment sheet number field 1533 is an item for setting for each of how many sheets the image analysis process is performed, and the number of sheets can be set through a numeric keypad or the like which is not illustrated.

At an item of barcoding, it is possible to set whether or not to perform storage using a storage button 1540. By depression of the button, whether or not storage is performed is alternately switched. A judgment sheet number field 1533 is an item for setting for each of how many sheets the image analysis process is performed, and the number of sheets can be set through a numeric keypad or the like which is not illustrated. An application group button 1550 is a group of buttons for setting application to perform an image analysis process, and desired application is selected by depression of a button. At the application group button 1550, predetermined application is associated with the application buttons in advance.

It should be noted that while, in the above-described configuration, for each of predetermined number of sheets each image analysis process is performed can be individually set, it is also possible to adopt a configuration where only a predetermined number of sheets common among the image analysis processes can be set, or it is possible to adopt a configuration where for each of predetermined number of sheets each image analysis process is performed is determined at initial setting and cannot be set.

It should be noted that when an image read process is performed while a real time process is turned ON by setting, it is necessary to execute the process within a predetermined period. If the process cannot be performed within the predetermined period, it will become an obstacle to transmission of image data from the reading section and start of the next time image analysis process. If a process which is performed beyond the predetermined period is repeated, a memory is over capacity and control collapses.

Figure 5:
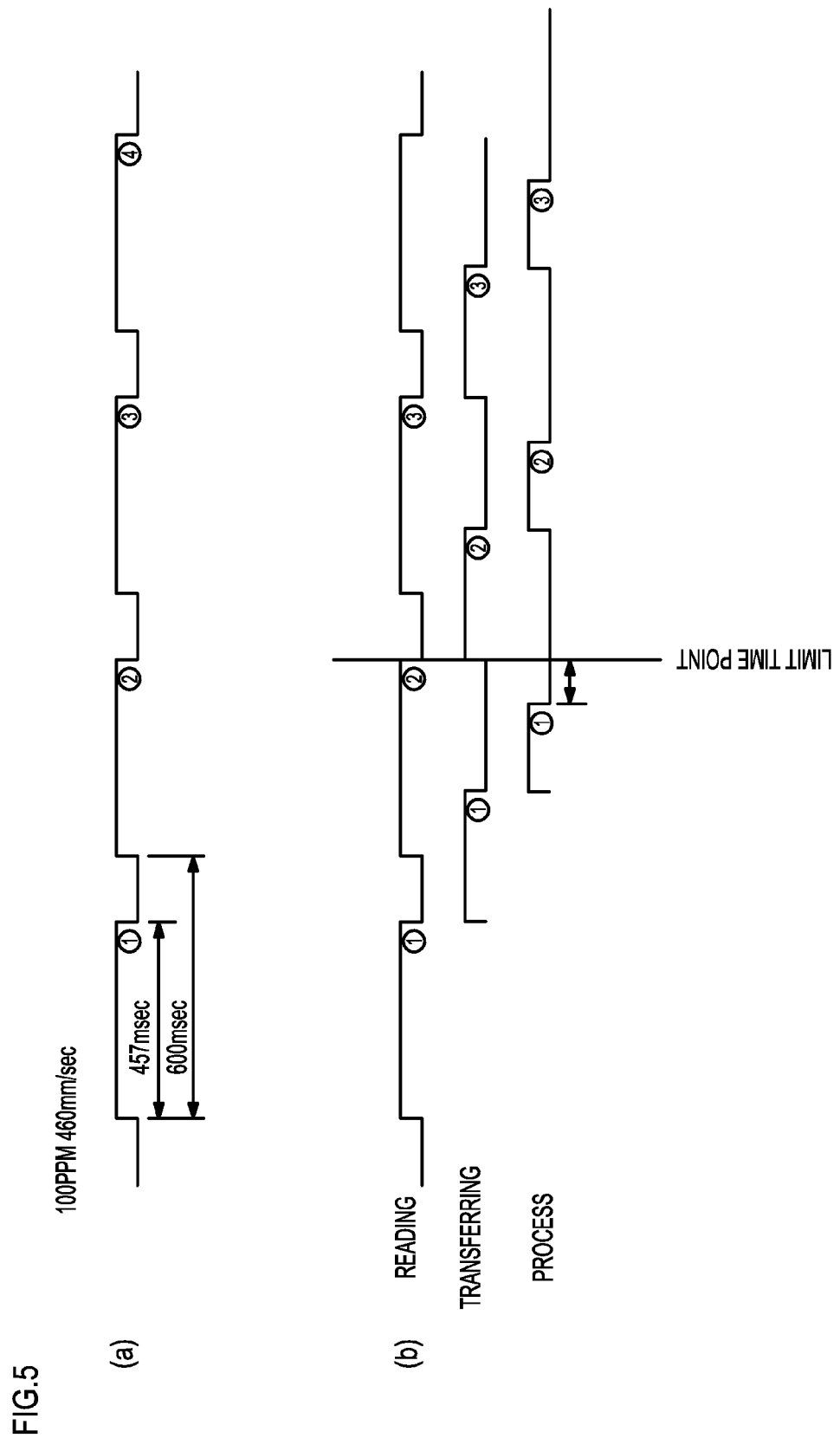
FIG. 5 is a timing chart of image formation, reading, transferring and image analysis processes of the embodiment of the present invention.

FIG. 5(a) illustrates a time chart for reading.

In the case of output of 100 PPM at linear velocity of 460 mm/sec, a period of one cycle is 600 msec, and it takes 457 msec for reading.

When image data corresponding to one face is stored in the image data memory 121 and an image analysis process is performed for each sheet, because it is necessary to read the whole face through a real time process, as illustrated in FIG. 5(b), if it takes 457 msec for reading, 300 msec for transferring the read image (including a period for transferring the read image from the reading section to the image memory or further a period for transferring the read image from the image memory to the HDD), and 200 msec for a process, 100 msec are left assuming that a time point at which transmission of image data for the next page from the reading section is started is used as a limit time point (reading of the next page is performed during the process of the previous page). To perform the process next time, it is necessary to perform image transfer and the process within one cycle of the image including a period between sheets. If a process which is performed beyond the one cycle of the image is repeated, a memory is over capacity and control collapses.

Figure 6:
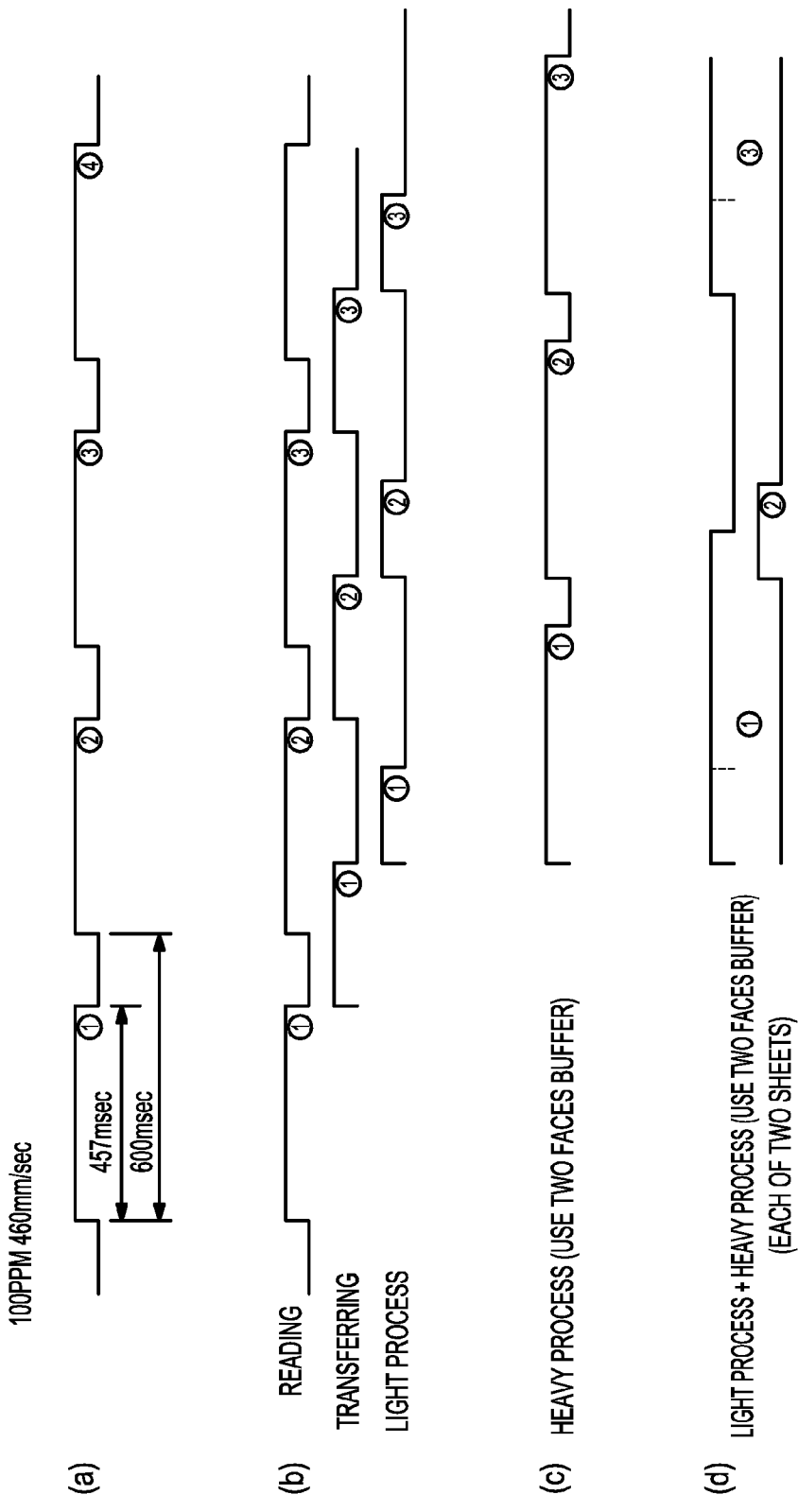
FIG. 6 is a timing chart of image formation, reading, transferring and image analysis processes in another example of the present invention.

FIG. 6(a) illustrates a time chart of the above-described reading. In the case of output of 100 PPM at linear velocity of 460 mm/sec, a period of one cycle is 600 msec, and a period required for reading is 457 msec.

When image data corresponding to one face is stored in the image data memory 121 and an image analysis process is performed for each sheet, because it is necessary to read the whole face through a real time process, as illustrated in FIG. 6(b) and described above, if it takes 457 msec for reading an image, 300 msec for transferring the read image and 200 msec for a process, 100 msec are left (reading of the next page is performed during the process of the previous page). To perform the process next time, it is necessary to perform image transfer and the process within one cycle of the image including a period between sheets. If a process which is performed beyond the one cycle of the image is repeated, a memory is over capacity and control collapses.

Meanwhile, when a heavy process is performed, if image data corresponding to two faces can be stored in the image data memory 121 and the HDD while the above-described limit cannot be satisfied, as illustrated in FIG. 6(c), by completing the process before transferring of the image data of the second sheet is finished, it is possible to perform the process next time.

In this case, even if it takes 300 msec for transferring, it is possible to use 600 msec for the process. If the process is extremely heavy and it takes 600 msec or more for the process, it is possible to perform such a process by performing the process once every two pages.

Further, if a heavy process and a light process are performed, even if image data corresponding to two faces can be stored in the image data memory, the above-described limit time cannot be satisfied. Therefore, as illustrated in FIG. 6(d), by performing an image analysis process for each of two sheets, the process can be completed before transmission of the third sheet is started, so that the process can be performed without incurring collapse of control. That is, if a heavy process and a light process overlap, it is possible to perform the processes such that the light process is performed for each page and the heavy process is performed once every two pages.

Procedure for selecting an image analysis process will be described below based on the flowcharts of FIG. 7 to FIG. 11. Each procedure is executed by the operation of the CPU 101.

Figure 3:
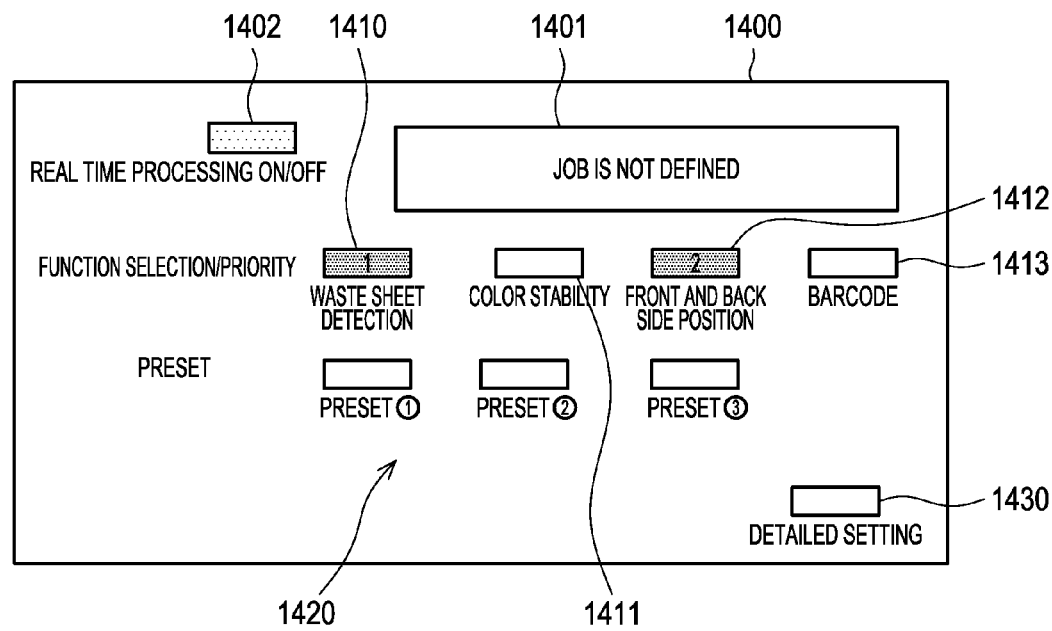
FIG. 3 is a diagram illustrating an image analysis process setting screen of the embodiment of the present invention.
Figure 4:
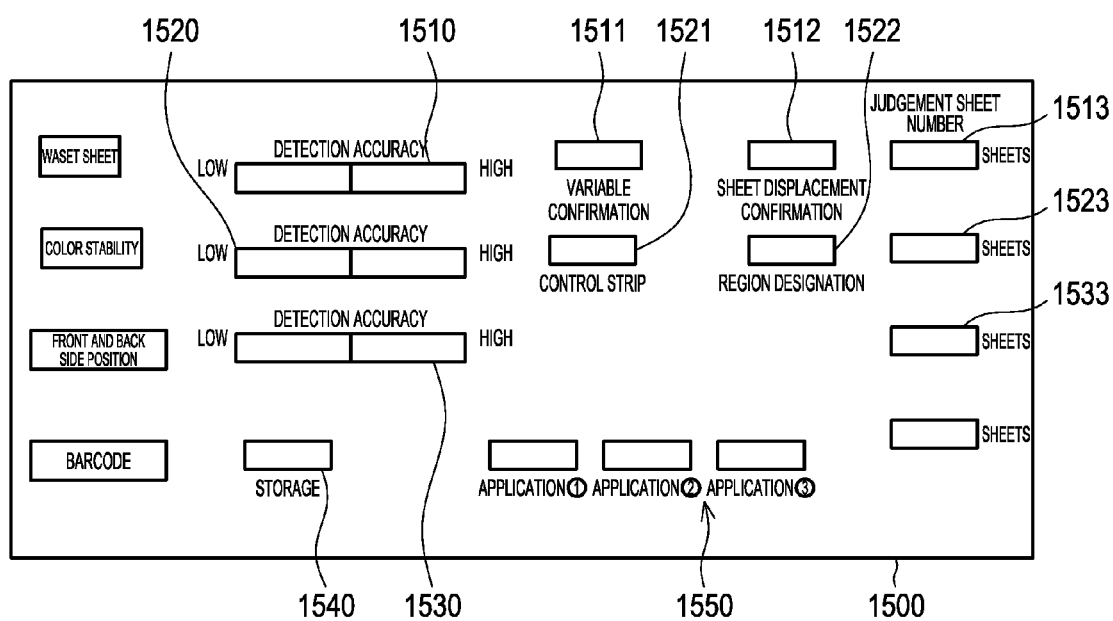
FIG. 4 is a diagram illustrating an image analysis processing detailed setting screen of the embodiment of the present invention.
Figure 7:
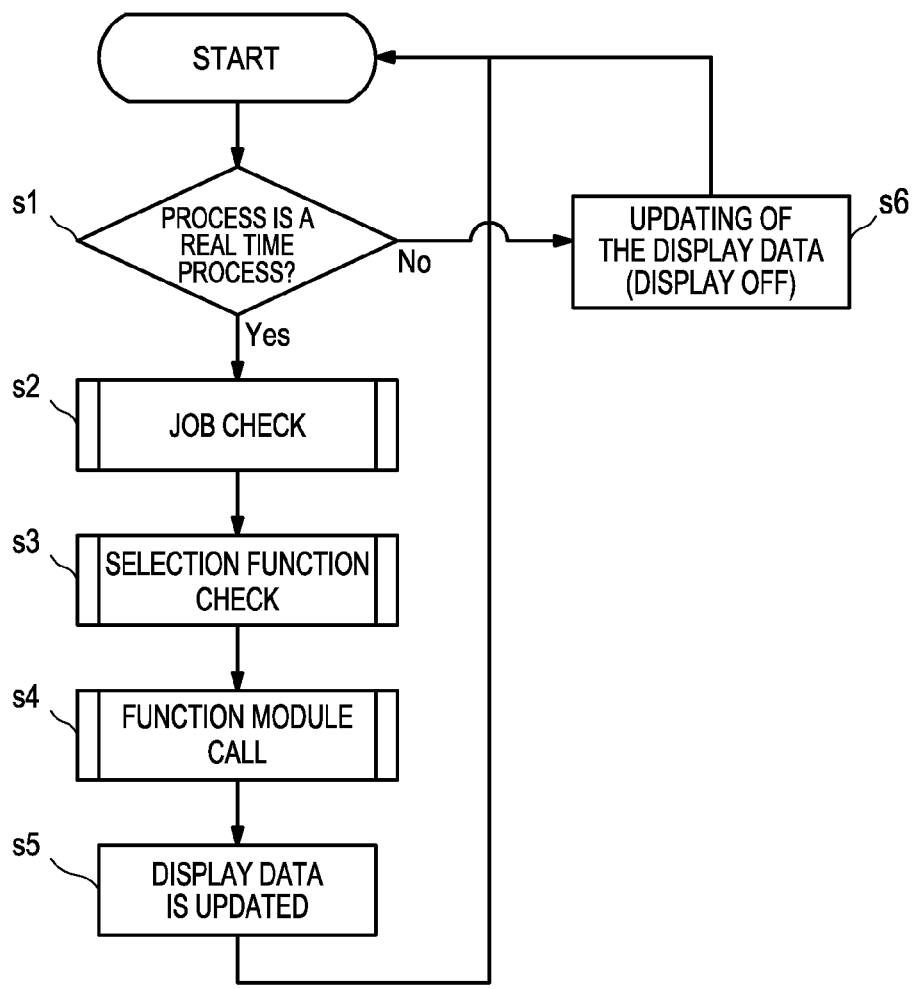
FIG. 7 is a flowchart illustrating a main flow of process procedure in the image analysis process of the embodiment of the present invention.

In the main flow illustrated in FIG. 7, monitoring of a user interface/monitoring of job entry are always performed through a real time process, and if the state changes, display data illustrated in FIG. 3 and FIG. 4 is updated. The display data includes display of an alarm for a user through a pop-up.

That is, in the main flow, whether or not the process is a real time process is confirmed (step s1), if the real time process is not selected (step s1: No), updating of the display data is turned OFF (step s6), and the flow returns to "START".

If the real time process is selected (step s1: Yes), job check (step s2), selection function check (step s3), function module call (step s4) are performed, and, then, the display data is updated (step s5), and the flow returns to "START".

Figure 8:
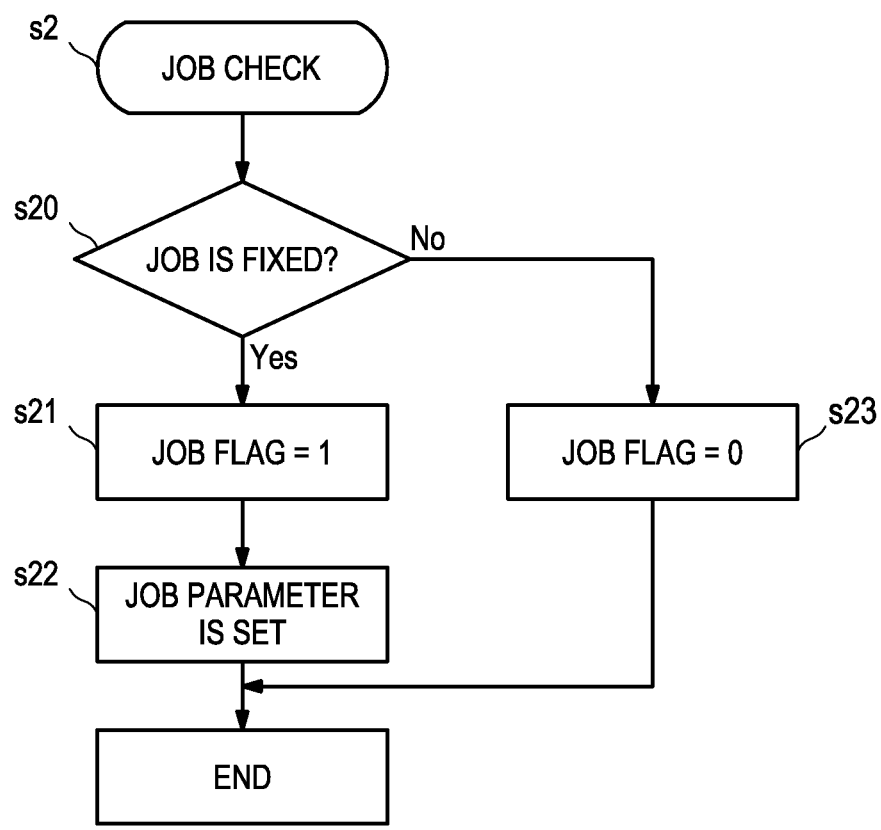
FIG. 8 is a flowchart illustrating a routine of job check in the main flow of the embodiment of the present invention.

A routine of the job check will be described based on the flowchart of FIG. 8.

In the job check (step s2), whether or not a job is fixed is judged (step s20), and if the job is fixed (step s20: Yes), 1 is set for a job flag (step s21), a job parameter is set (step s22), and the process is finished. If a job is not fixed (step s20: No), 0 is set for a job flag (step s23), and the process is finished.

Figure 9:
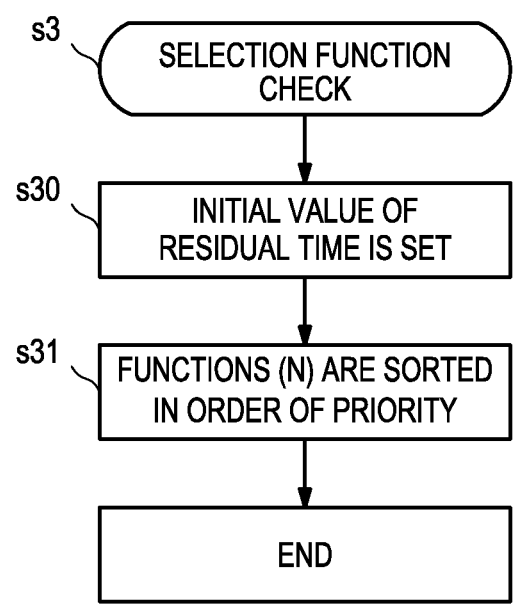
FIG. 9 is a flowchart illustrating a routine of selection function check in the main flow of the embodiment of the present invention.

A routine of the selection function check will be described next based on the flowchart of FIG. 9.

In the selection function check (step s3), an initial value of residual time left until reaching a limit time is set (step s30), functions N are sorted in order of priority (step s31), and the process is finished.

Figure 10:
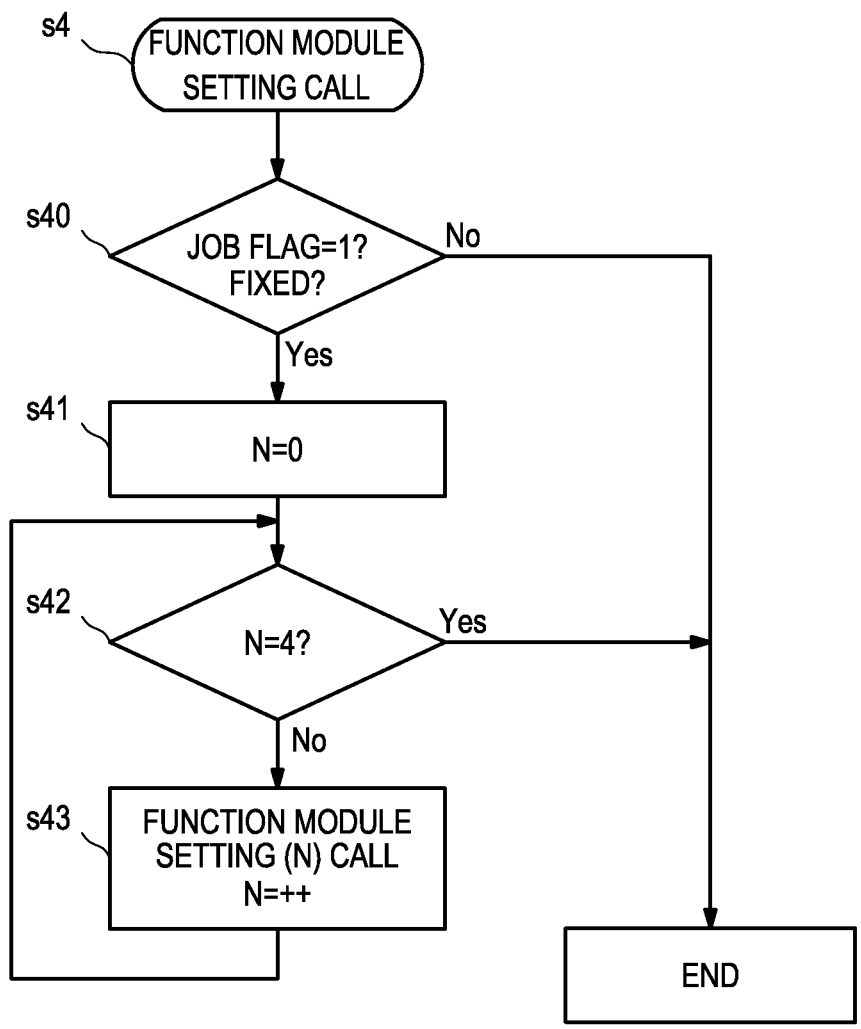
FIG. 10 is a flowchart illustrating a routine of function module setting call of the embodiment of the present invention.

A routine of the function module setting call will be described based on the flowchart of FIG. 10.

In the function module setting call (step s4), whether or not a job flag is 1 is judged (step s40), if the job flag is not 1 (step s40: No), the process is finished.

If the job flag is 1 (step s40: Yes), 0 is set for N (step s41), whether or not N is 4 is judged (step s42). While the value of N is set at 4 in this embodiment because the maximum number of image analysis processes is 4, this value changes according to the number of image analysis processes.

If N is 4 (step s42: Yes), the process is finished. If N is not 4, the function module setting N is called. An initial value of N is set at 0 in order of priority. After the call, 1 is added to N (step s43). Subsequently, the flow returns to step s42, and the process is repeated until N becomes 4.

It should be noted that while in the above description, a type of the image analysis process is automatically selected in order of priority, it is also possible to display the content of the image analysis process at the operation display section so as to allow a user to select an image analysis process. In this case, image analysis processes may be sequentially selected, or after an image analysis process is selected once, types of image analysis processes which can be further selected may be displayed at the operation display section so as to allow the user to select the image analysis process.

Figure 11:
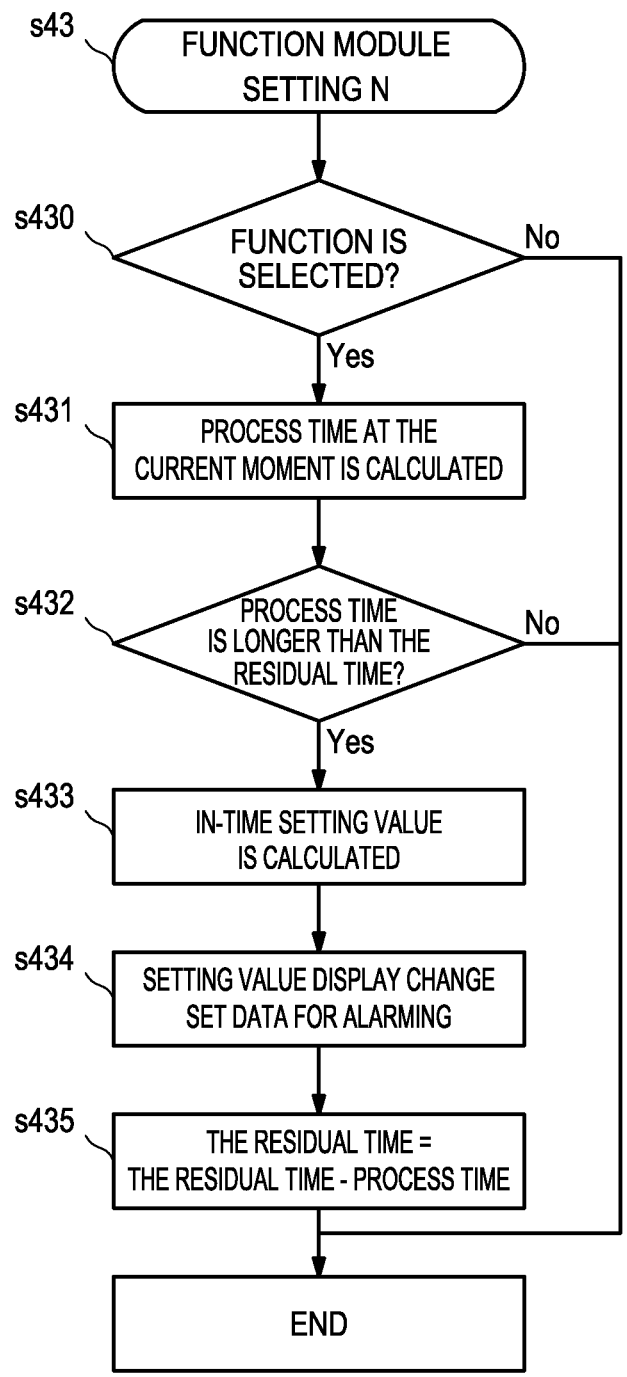
FIG. 11 is a flowchart illustrating a routine of a function setting module N of the embodiment of the present invention.

A routine in the function module setting N will be described next based on the flowchart of FIG. 11.

In the function module setting N call (step s43), whether or not a function is selected is judged (step s430). If a function is not selected through the user interface, or the like (step s430: No), the process is finished. If a function is not selected through the user interface, or the like, the process escapes from the flow without performing any process.

If a function is selected (step s430: Yes), process time required for the image analysis process at the current moment is calculated (step s431).

The process time is determined based on a data amount required for the image analysis process and/or operation accuracy of each image analysis process. The data amount can be determined from an area of the image region which is to be processed and resolution of an image to be read. It should be noted that the process time is determined taking into account time for transferring image data to the image data memory and time for transferring image data from the image data memory to the HDD.

Subsequently, whether or not the process time is longer than the residual time is judged (step s432). If the process time does not exceed the residual time (step s432: No), the process is finished.

If the process time is longer than the residual time, the following is executed.

First, time in association with change of detection accuracy or change as to whether or not option is selected illustrated in FIG. 4 is calculated, and an in-time setting value is calculated so that the process time is within the residual time (step s433). The content alarming the user the detection accuracy or that the option selection is automatically changed is stored in the memory (step s434). Subsequently, new process time obtained by subtracting the changed process time from the residual time is set (step s435), and the process is finished.

It should be noted that if the process time exceeds the residual time, it is also possible to define adjustable features of the detection accuracy or matters to be changed as to whether or not option is selected, and to perform adjustment in order of priority among features and matters. Further, if the process time cannot be made within the residual time by the adjustment, it is also possible to eliminate an item of the corresponding image analysis process from selection.

Further, when the process time is longer than the residual time, it is also possible to display the image analysis process at the operation display section to allow the user to select the image analysis process to be executed. When one image analysis process is selected, if it is possible to execute further image analysis process, it is also possible to display other image analysis processes at the operation display section to allow the user to further select an image analysis process.

In updating of the display data in the main flow (step s5), the display data is updated last, and thereby one cycle of the main flow is finished. Typically, when a screen of FIG. 3 or FIG. 4 opens, the updated display data is displayed to the user. If the alarm content is stored in the memory, it is also possible to notify the user of change using a pop-up, or the like even in the case that the user uses the other screen.

With the above-described configuration, it is possible to read an image in real time upon image formation and execute one or more image analysis processes, so that it is possible to perform a real time process which is user friendly.

Further, it is possible to easily adjust relationship between the process time and accuracy if the user selects a plurality of real time processes. For example, when output is mainly graphics and importance is placed on color stability, 1 (highest priority) is set for the priority of color stability, and setting is performed so that accuracy becomes highest.

If importance is placed on waste sheet detection, for example, in variable printing or additional printing, 1 is set for priority of waste sheet detection, so that accuracy becomes highest. Further, if the user desires to realize both of waste sheet detection and color stability, the user can perform adjustment through setting of accuracy so that the both can be realized. It is possible to easily set a function which the user desires most.

While the present invention has been described above based on the above-described embodiment, the present invention can be modified as appropriate without deviating from the scope of the present invention.

What is claimed is:

1. An image forming device comprising:
   a printer that forms an actual image of printing of an actual print job on a sheet;
   a sheet discharger that discharges the sheet on which the actual image of the actual print job has been formed to an outside of the image forming device;
   a conveying path that conveys the sheet;
   a scanner that reads the actual image of the actual print job formed on the sheet on the conveying path leading from the printer to the sheet discharger and that outputs image data of the actual image of the actual print job; and
   a control section that includes a CPU and that controls image formation to sequentially form actual images of the actual print job on sheets at a predetermined cycle,
   wherein the control section receives the image data of the actual image of the actual print job from the scanner, can execute a plurality of types of image analysis processes on the image data of the actual image of the actual print job, and selects and executes one or more types of image analysis processes which can be executed from among the plurality of types of image analysis processes for a predetermined number of the sheets.

2. The image forming device according to claim 1, wherein the control section sets a same or a different number for the predetermined number of sheets for each type of an image analysis process.

3. The image forming device according to claim 1, wherein when the control section selects the image analysis processes for each of the predetermined number of the sheets, the control section selects the image analysis processes so that a process time for the image analysis processes does not exceed a transferring start time point at which image data of sheets of a next page and thereafter is started to be output from the scanner and transferred.

4. The image forming device according to claim 1, further comprising a memory that temporarily stores the image data read at the scanner and transferred to the control section,
   wherein the control section can perform the image analysis processes in parallel with the transfer of the image data from the scanner to the memory, and
   wherein the control section selects the image analysis processes according to a transfer time for transferring the image data from the memory to the control section and a time required for the image analysis processes.

5. The image forming device according to claim 4, wherein when the control section selects the image analysis processes for each of the predetermined number of the sheets, the control section selects the image analysis processes so that a process time for the image analysis processes does not exceed a time point at which image data read at the scanner for a sheet after the predetermined number of sheets is started to be transferred from the memory to the control section.

6. The image forming device according to claim 1, wherein when the control section selects the image analysis processes, the control section determines a process time used for judgment based on a data amount required for each image analysis process and/or operation accuracy of each image analysis process.

7. The image forming device according to claim 6, wherein the control section determines the data amount from an area of an image region to be processed and/or a resolution of an image to be read.

8. The image forming device according to claim 1, further comprising a touch panel that receives an operation from a user and selects the image analysis processes.

9. The image forming device according to claim 8, wherein the control section presents executable processes as options to the user and selects a process designated by the user through the touch panel.

10. The image forming device according to claim 9, wherein when the user designates a desired image analysis process, the control section executes selection of the image analysis process and further presents other image analysis processes as options to the user over again.

11. The image forming device according to claim 1, wherein when a process time exceeds a limit time according to the selected image analysis processes, the control section performs adjustment so that the process time becomes within the limit time by changing a number of image analysis processes to be executed.

12. The image forming device according to claim 1, wherein when a process time exceeds a limit time according to the selected image analysis processes, the control section performs adjustment so that the process time becomes within the limit time by reducing process time for one or more of the image analysis processes.

13. The image forming device according to claim 12, wherein the control section reduces the process time by changing content of the image analysis processes.

14. The image forming device according to claim 1, wherein the control section sequentially performs the plurality of image analysis processes, and selects executable processes for each of the predetermined number of sheets based on accumulation of a process time of the plurality of image analysis processes.

15. The image forming device according to claim 1, wherein the control section performs the plurality of image analysis processes in parallel, and selects executable processes for each of the predetermined number of sheets based on a process time of the parallel processes.

16. The image forming device according to claim 1, wherein the control section preferentially selects image analysis processes having a higher priority in an order of priority determined in advance.

17. An image forming method for an image forming device or an image forming system, the method comprising:
performing control to sequentially form actual images of printing of an actual print job on sheets at a predetermined cycle;
performing control to read with a scanner, an actual image of the actual print job formed on a sheet and output image data of the actual image of the actual print job from the scanner; and
performing control to receive the image data of the actual image of the actual print job from the scanner, enable a plurality of types of image analysis processes to be executed on the image data of the actual image of the actual print job, and select and execute one or more types of image analysis processes which can be executed from among the plurality of types of image analysis processes for a predetermined number of the sheets.

18. The image forming method according to claim 17, wherein a same or a different number is set for the predetermined number of the sheets for each of the types of the image analysis processes.

19. The image forming method according to claim 17, wherein when the image analysis processes are selected for each of the predetermined number of the sheets, the image analysis processes are selected so that a process time for the image analysis processes does not exceed a starting time point at which image data of a sheet of a next page and thereafter is started to be output from a scanner.

20. The image forming method according to claim 17, further comprising temporarily storing the image data and transferring the image data to the image analysis processes,
wherein the image analysis processes can be executed in parallel to temporal storage of the image data, and
wherein the image analysis processes are selected according to a transfer time for transferring the temporarily stored image data and a time required for the image analysis processes.

21. The image forming method according to claim 17, wherein image analysis processes having a higher priority are preferentially selected in an order of priority determined in advance.

22. An image forming method comprising:
performing control to sequentially form actual images of printing of an actual print job on sheets at a predetermined cycle;
performing control to read with a scanner, an actual image of the actual print job formed on a sheet and output image data of the actual image of the actual print job from the scanner; and
performing control to receive the image data of the actual image of the actual print job from the scanner, enable a plurality of types of image analysis processes to be executed on the image data of the actual image of the actual print job, and select and execute one or more types of image analysis processes which can be executed from among the plurality of types of image analysis processes for a predetermined number of the sheets.

23. An image forming system comprising:
a printer that forms an actual image of printing of an actual print job on a sheet;
a conveying path that conveys the sheet;
a scanner that reads the actual image of the actual print job formed on the sheet on the conveying path and that outputs image data of the actual image of the actual print job; and
a control section that includes a CPU and that controls image formation to sequentially form actual images of the actual print job on sheets at a predetermined cycle, wherein the control section receives the image data of the actual image of the actual print job from the scanner, can execute a plurality of types of image analysis processes on the image data of the actual image of the actual print job, and selects and executes one or more types of image analysis processes which can be executed from among the plurality of types of image analysis processes for a predetermined number of the sheets.

* * * * *